Jan. 18, 1966  V. H. MONTEIL  3,230,285

METHOD FOR FORMING PLASTIC MATERIAL

Filed Nov. 8, 1961  2 Sheets-Sheet 1

INVENTOR.
VERNON H. MONTEIL

BY Thomas S. MacDonald
ATTORNEY

Jan. 18, 1966  V. H. MONTEIL  3,230,285
METHOD FOR FORMING PLASTIC MATERIAL
Filed Nov. 8, 1961  2 Sheets-Sheet 2

INVENTOR.
VERNON H. MONTEIL
BY
Thomas S. MacDonald
ATTORNEY

3,230,285
Patented Jan. 18, 1966

3,230,285
METHOD FOR FORMING PLASTIC MATERIAL
Vernon H. Monteil, Canoga Park, Calif., assignor to
North American Aviation, Inc.
Filed Nov. 8, 1961, Ser. No. 150,990
3 Claims. (Cl. 264—84)

This invention relates to a method for forming shaped articles from plastic material and more particularly relates to a method which utilizes a precisely controlled forming technique for explosively setting plastic materials. Explosive setting should be herein understood to mean that condition whereby a formed plastic material assumes a fixed shape and thus resists any tendency to return to its original configuration.

Present methods for forming plastic materials have largely comprised the steps of either heating the material and forcing such material into the desired shape or conversely, forcing it into shape and subsequently forming it with the aid of heat. Such methods are relatively slow, costly and do not provide the close tolerances necessary in many modern day applications. For example, the manufacturing steps utilized for the forming of plastic lip seals generally comprises the steps of placing a precut blank into a die, forcing said blank into final position and heating it to a relatively high temperature approximating 300° to 400° F. for a specified period of time. The tolerances necessary for such seals are ofttimes critical and the above described standard method has, to a large measure, failed to provide such desirata. Furthermore, many seals formed by such methods show a tendency to return to their original configuration. Therefore, the rejection rate of such formed parts is necessarily quite high. Such a rejection rate when coupled with the relatively long forming cycle used therefor provides a finished part having a relatively high cost.

The present invention has overcome many of the inadequacies which are inherent with the above described prior art methods. The novel concepts of this invention are particularly adapted for the forming of plastic lip seals. In accordance therewith, a ring shaped flat blank member is placed onto a female die member and said blank is then held on said die member with a predetermined amount of holding force. The blank is then explosively set onto said die member with an explosive force of extreme magnitude. Unique energy control techniques are utilized to accurately control such extreme forces to thus precisely form such blank into said lip seal. By using the novel concepts of this invention it has been found that the formed seal resists any tendency to return to its original generally flat configuration.

An object of this invention is to expeditiously and inexpensively form plastic material.

A further object of this invention is to provide a method for expeditiously and efficiently forming shaped articles from plastic sheet materials.

A still further object of this invention is to change a relatively small amount of explosive forming force to one of extreme magnitude to thus expeditiously and accurately form plastic material.

A still further object of this invention is to economically form plastic lip seals.

These and other objects of this invention will become apparent from the following description taken in connection with the accompanying drawings, in which:

FIG. 1 is a detailed view of a preferred embodiment of a disassembled appartus or die assembly utilized to carry forth the novel concepts of this invention;

FIG. 2 discloses the explosive forming apparatus of FIG. 1 as it would appear in assembled condition;

Figure 1:
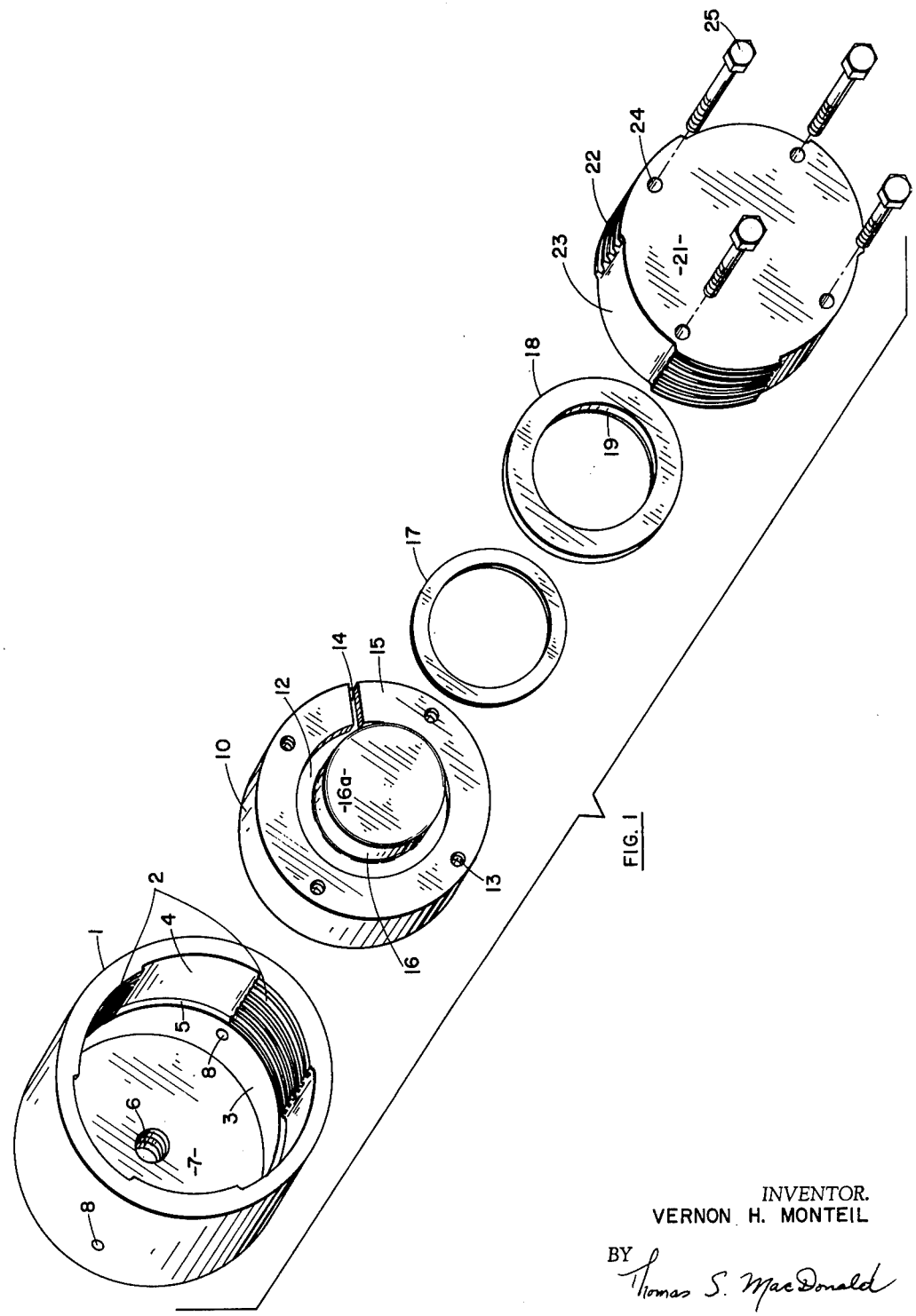

FIG. 1 discloses a detailed disassembled view of an explosive forming apparatus or die assembly embodiment which may be used to carry forth the novel explosive forming concepts of this invention. As shown, the apparatus comprises an outer housing member 1 having internal thread or screw means 2 formed on selected portions of the inwardly facing wall 3 thereof. Slot portions 4 are formed in the thread means 2 to extend coextensively therewith and terminate in ledge portions 5 for assembly purposes, as will be hereinafter more fully explained. A threaded bore 6 is formed through the base surface portion 7 of the outer housing and is adapted to contain a standard explosive charge therein, for purposes hereinafter more fully explained. Two or more relief ports 8 may be formed through the side walls of member 1 in order to control and relieve excessive explosive forming pressure build-up.

The assembly further comprises a preferably disc shaped die member 10 which is arranged in sliding relationship in said housing member 1. The die member 10 provides a base surface portion 11 thereon (FIG. 3) and further has a female die cavity 12 (FIG. 4) formed therein. Four threaded apertures 13 are preferably constructed and arranged on selected peripheral portions of the die member 10. A laterally extending slot portion 14 may be optionally formed in the wall portions 15 of the die member 15. Such a slot portion 14 functions to aid in the removal of the finished workpiece, i.e., an appropriate tool may be inserted therein to aid in such removal. An upstanding guide post 16 terminates in a surface portion 16a which is formed on one extremity of the die member 10. The surface portion 16a functions in an energy absorption and shielding manner during the explosive forming operation, as will be hereinafter more fully explained.

The workpiece or precut blank 17 preferably comprises a ring shaped configuration, as shown, and is adapted to be formed into a conventional lip seal, for example. As hereinbefore stated, the novel concepts of this invention are particularly adapted for the forming of such lip seals. However, it should be understood that the novel concepts of this invention may also be utilized to form other shaped articles from a plastic sheet material.

Plastic materials which may be employed in connection with the novel concepts of this invention are any organic polymer whether naturally occurring or synthetically prepared. Thus, thermoplastic, thermosetting, elastomeric, polymeric, and plastic materials of any description may be employed. These materials may be either naturally occurring, modified materials occurring in nature, or synthetically prepared.

Among the thermoplastic materials which may be employed are polymers and copolymers of mono-olefinic hydrocarbon having at least two carbon atoms. Thus, the polymers and copolymers of ethylene, propylene, various butenes, pentenes, and hexenes, as well as the halogenated counterparts of these olefins may be employed in the practice of this invention, as well as their halogenated counterparts. Among the thermosetting polymeric materials which may be employed are those plastics and resins which cure to a solid upon the application of heat with or without a chemical curing agent. Illustrative examples of this class of material include the polyurethane resins, epoxide resins, polyester materials, and di(thioalkoxy) methylene polymers (polysulfide polymers). In addition, elastomers, such as the natural and synthetic rubbers, may be practicably and profitably employed in the practice of this invention. The synthetic rubbers are ordinary polymers and copolymers of a diolefin (as a major constituent) with other olefin constituents and which are subject to vulcanization with sulfur subsequent to polymerization to cross-link the polymer through any remaining carbon-to-carbon double bonds. In addition to the above, organic polymers derived from naturally occurring non-elastomeric polymeric materials may be employed in the practice of this invention.

In general, carbohydrate condensation-type polymers, amino-acid condensation polymers, synthetic linear condensation polymers including the polyamides and polyesters, linear addition polymers such as hydrocarbon and vinyl-type polymers, and cross-linking polymers may be employed to prepare the products of this invention.

The condensation-type polymers are cellulose, cellulose nitrate, cellulose acetate, cellulose acetate-butyrate, ethylcellulose, and the cellulose ethers such as methyl carboxymethyl, hydroxyethyl, cyanoethyl and benzyl cellulose. In addition, such carbohydrate condensation-type polymers as starch, chitin, and formaldehyde polymers may be employed.

Examples of the amino-acid condensation polymers are regenerated proteins such as casein and vegetable globulins. Synthetic linear condensation polymers which may be employed in the practice of this invention include the polyamides such as nylon, and polyurethane resins, polyesters such as the alkyd and fiber-forming types, polyester and polyesteramide rubbers.

Applicable linear addition polymers include natural and vulcanized rubbers such as gutta-percha, balata, and chicle, cyclized or isomerized rubber, rubber hydrochloride, polybutadiene rubbers including GR–S and nitrile rubber, polychloroprene and its copolymers, polysulphide rubbers, polyisobutylene and the butyl rubbers, the various polyethylenes including chlorosulphonated polyethylene rubber, polytetrafluorethylene, polystyrene, polyvinylcarbazole and polyacenaphthylene, indene and coumarone-indene resins, polyvinyl acetate, polyvinyl alcohol, polyvinyl pyrrolidone, polyvinyl formal, polyvinyl acetal, and polyvinyl butyral, polyvinyl chloride, vinyl chloride-vinyl acetate copolymers, polyacrylonitrile, vinyl chloride-acrylonitrile copolymers, polyvinylidene chloride and its copolymers, polymethyl methacrylate and related polyacrylates, ketone aldehyde polymers and polyacrylate rubbers.

Cross-linking polymers applicable to the present invention include cross-linking type polyester resins, various epoxy resins, polymerized drying oils, aniline formaldehyde resins, sulphonamide-formaldehyde resins, urea-formaldehyde resins, melamine-formaldehyde resins, and the various phenol-formaldehyde condensation resins.

Furthermore, organic polymers containing elements other than carbon, hydrogen, oxygen, and nitrogen may be employed. For example, silicon-containing polymeric materials are advantageously adapted to the practice of this invention. The silicon-containing polymers fall into two general classes; that is, those having direct silicon-to-carbon bonds (the silanes) and those having silicon-bonded to carbon through oxygen (the siloxanes). The silicon-containing materials often have a halogen in the molecule.

It is often advisable to employ plasticizers in the preparation and utilization of the polymeric and plastimeric materials employed in the invention. Examples of plasticizers include triacetin, the various phthalates such as diethyl phthalate, dibutyl phthalate, dioctyl phthalate, di-(methoxyethyl)phthalate, methyl phthalyl ethyl glycolate, ethyl phthalyl ethyl glycolate and butyl phthalyl butyl glycolate, sebacates such as dibutyl and dicotyl sebacates, adipates such as dioctyl adipate and di(3,5,5-trimethylhexyl)adipate, glycol esters of higher fatty acids, organic phosphate esters such as tributoxyethyl phosphate, nitroglycerin, butane triol trinitrate, diglycol dinitrate, ethylene glycol dinitrate, and the like.

More specifically, the novel concepts of this invention are particularly adapted for the forming of a solid polymer of a halogenated alkene. Still more specifically, the novel concepts of this invention have been successfully used to form polytrifluorchloroethylene (Kel-F) and polytrifluorethylene (Teflon) constituents.

A ring shaped member 18 has means forming a male die portion 19 thereon (FIG. 3), which male die portion is adapted to cooperate with the female die portion 12 in a complementary manner in order to form the workpiece 17 into the desired lip seal configuration. Although the ring shaped member 18 has been illustrated as a separate element in the die assembly, it should be understood that it may be formed as an integral part of a hold member 21, if so desired. However, by constructing the member 18 as a separate unit it is possible to more expeditiously facilitate the forming of workpieces 17 of varied configurations.

It can be seen that the hold member 21 also comprises a second die member in conjunction with the ring shaped member 18 to thus provide for the precise forming of the workpiece 17 with the first die member 10. The hold member 21 preferably has three thread means or sections 22 formed on the periphery thereof. Such thread means are adapted to cooperate with the thread means 22 formed in the outer housing 1 to secure the elements of the assembly in a fixed axial relationship, relative to each other. Three surface portions 23 are formed through the thread means 22 on the periphery of the retaining member 21 to aid in such a securing function. Other securing means such as a properly constructed key-way means may be used in lieu of such thread means to secure the outer housing 1 and retaining member 21 together, if so desired.

With such a construction and arrangement it becomes apparent that the thread means 22 of retaining member 21 may be inserted into the slots 4 formed in the outer housing until the thread means 22 are maintained in abutting relationship with the ledge portions 7 formed on the internal wall portions of housing member 1. The retaining member 21 may then be rotated 60°, for example, to axially lock the two members together. Bolt apertures 24 are preferably formed through the retaining member 21 in order to guide fastening or securing means, preferably in the form of adjustment bolts 25, therethrough and into engagement with threaded apertures 13, as more clearly shown in FIG. 3. As will be hereinafter more fully explained, such a fastening means permits a limited sliding movement of die member 10 relative to housing 1 and hold member 21.

Figure 3:
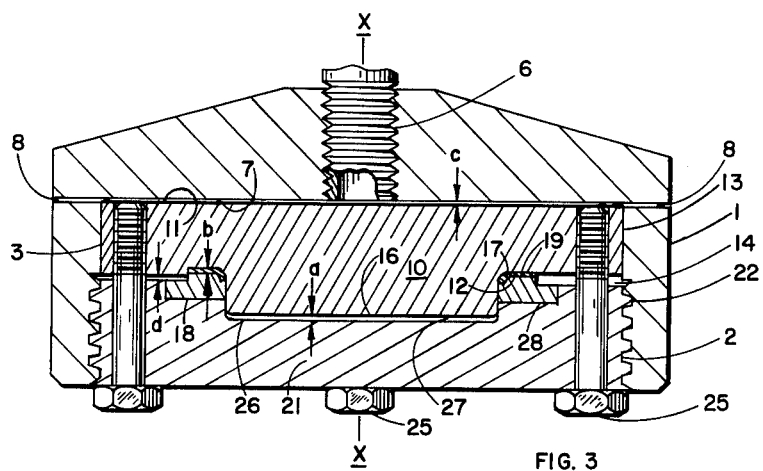
FIG. 3 is a partial cross-sectional view taken on lines 3—3 in FIG. 2.

FIG. 3 further discloses an upwardly facing recessed portion 26 which is also formed in the retaining member 21. Such a recessed portion is constructed and arranged to cooperate with the downwardly facing base portion 16 of the die member 10 to thus form a shock absorption and shielding chamber 27 therebetween. A second recessed portion 28 is formed in the retaining member 21 and functions to retain the ring member 18 therein, as shown.

Figure 2:
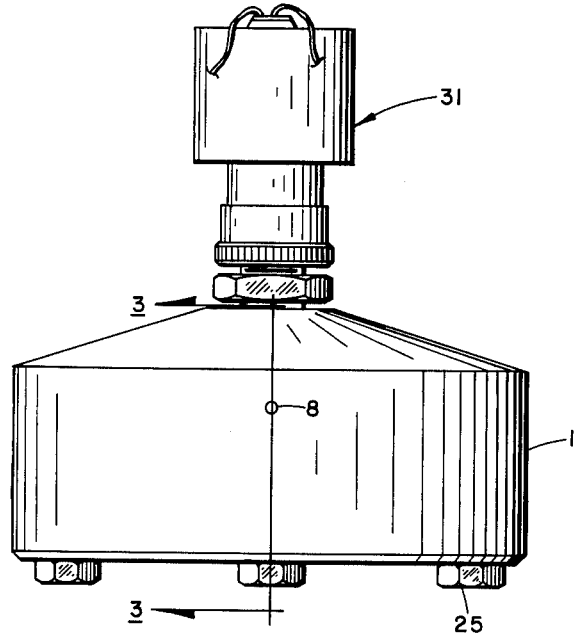

FIG. 2 discloses the above described apparatus as it would appear in assembled position. An explosive means 31 is secured to housing 1 by complementary screw means thereon which cooperate with threaded bore 6. As hereinbefore stated, the explosive means 31 functions to discharge an explosive force of predetermined magnitude against the female die member 11.

METHOD OF ASSEMBLY AND OPERATION

The hereinbefore described detailed elements of FIG. 1 are preferably formed into the unitary assembly of FIGS. 2 and 3 in the following manner.

The precut blank or workpiece 17 and ring member 18, respectively, are first placed over the base portion 16 of the die member 10. The retaining member 21 is then bolted to the die member 10 by means of adjustment bolts 25 with a predetermined distance $a$ being maintained between the surface portions 16 and 26 which form the chamber 27. The distance $a$ is arranged such so as to prevent contact between the surfaces 16 and 26 during the forming operation and also provide for a shock absorbing type feature as will be hereinafter more fully explained. Also, the construction and arrangement is such as to maintain the female die cavity 12 at a predetermined distance $b$ from the male die portion 19 of ring member 18 to thereby impart a predetermined initial amount of holding force to workpiece 17. It should be noted in this regard that the separation distance $b$ generally comprises the thickness of the workpiece 17. However, a slightly greater distance $b$ than the thickness of the workpiece may be used, if so desired. It should be particularly noted that the adjustment bolts 25 provide for the very accurate obtainment of the above described distances. It should be further noted that shim means in the form of disc type washers, for example, may be used between the heads of adjustment bolts 25 and the hold member 21 in order to expeditiously achieve the desired adjustment.

As shown in FIG. 3, the thread means formed on the bolt member 25 are preferably only constructed and arranged in securing relationship with respect to the die member 10. With such a construction and arrangement a predetermined degree of relative movement is afforded between the die member 10 and the retaining member 21. The subassembly thus formed is then inserted into the outer housing 1 in the manner hereinbefore described, i.e., the respective cooperating thread means 2 on the outer housing 1 and 22 on the retaining member 22 maintain the housing and retaining member in relatively fixed axial relationship with respect to each other.

An explosive force of predetermined magnitude is then discharged against the die member 10 by means of the explosive means 31. Such a discharged force is applied to the relatively large surface or base surface portion 11 of the die member 10 to thus explosively set the workpiece in its final fabricated portion. The relief ports 8 are formed of predetermined cross-sectional area and used in many applications to aid in the precise control and relief of excessive explosive forming pressure build-up therethrough to thus prevent possible damage to the die and the formed workpiece. The separation distance $c$, between the base surface portion 7 of the housing 1 and the base surface portion 11 of die member 10, is preferably selected from a range of from .005 in. to .200 in.

Thus, it can be readily seen that by means of such a construction and arrangement a relatively large amount of pressure may be imparted to the formed lip seal by means of an explosive force of relatively small magnitude. Such is primarily true due to the fact that substantially the same force which is imparted to the relatively large surface area of die member 10 is concentrated onto the relatively small force subjected surface area of the lip seal. It should be noted that such a forming force is directly transmitted to the formed seal by means of the female die cavity, i.e., which cavity forms a surface area approximating that of said seal surface area. It is preferable in most applications to select the ratio of surface 11 area to the effective force exposed surface area of the workpiece from a range of 10:1 to 500:1.

As hereinbefore stated, the slot 14 may be used to permit expeditious removal of the formed workpiece. It should be noted that the chamber 27 forms a substantial air trap and thus functions as a shock absorbing type of shielding means during the explosive forming process. In this regard, it should be further noted that such a shock absorbing function aids in the prevention of possible damage to the die members and also aids in the precise forming of the workpiece since a predetermined amount of explosive forming force may be closely controlled and imparted to the workpiece. Thus, two basic control means are provided which function independently of the other die assembly design considerations, i.e., a predetermined amount of undesirable explosive forces may be relieved by means of relief ports 8 and/or absorbed by means of chamber 27.

It should be noted that the distance $d$, which defines the degree of relative movement permitted between the die member 10 and the retaining member 21, is very small and preferably within the range of .030 in. to .250 in. It should be further noted that explosive pressures in the range of 4,000 p.s.i. to 50,000 p.s.i. have been successfully used on the surface 11 of die member 10. Thus, it can be seen that when the ratio of surface area 11 to the effective force exposed workpiece surface area is within the range of 10:1 to 500:1, that explosive pressures in the range of 40,000 p.s.i. to 25,000,000 p.s.i. may be imparted to said workpiece surface area.

To briefly summarize the above description, it can be readily seen that selective control of one or all of the following basic variables provides for the precise and efficient forming of the workpiece: the type of material utilized for the workpiece 17 and the dimensions thereof; the dimensional selections of the parameters, $a$, $b$, $c$ and $d$; the type and intensity of the explosive charge utilized; the selected surface area ratio of the surface 11 and the force exposed surface to the workpiece 17; and the number and size of the relief ports 8. Although there are other design considerations (such as the relative masses of die assembly components) which must be considered with regards to any particular forming operation, the above mentioned variables comprise the basic ones.

Figure 4:
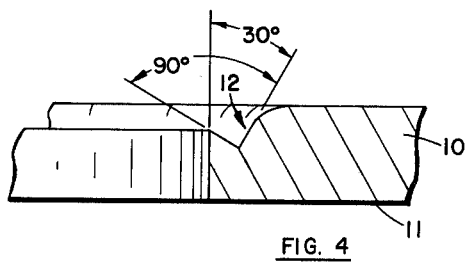
FIG. 4 is an enlarged partial cross-sectional view of a preferred female die cavity which may be employed with the apparatus of FIGS. 1–3.

As shown in FIG. 4, it is preferable in most lip seal forming operations that the female die cavity 12 comprise cooperating surface portions which form an angle substantially comprising 90°. The outermost surface portion is preferably arranged to form an angle of approximately 30° with a vertical axis, as shown.

*Example I*

A substantially flat shaped polytrifluorethylene (Teflon) workpiece constituent was placed in the die assembly and held therein with sufficient holding force to preform said workpiece in the die cavity. The workpiece comprised an outside diameter of approximately three inches and a thickness of 0.1 inch. The distances $a$, $c$ and $d$ were arranged at distances approximating 0.250 in., 0.005 in. and 0.150 in., respectively. An explosive charge approximating 11.4 grains (0.7417 gram) and constituting a standard black powder constituent (potassium nitrate, sulfur and carbon in the standard proportion) was ignited to discharge and impart an explosive pressure of approximately 35,000 p.s.i. onto the base surface portion 11 of die member 10. After the explosive forming step, the formed workpiece was removed and found to be smooth and regular. Subsequent periodic dimensional checking of the formed workpiece showed that it completely resisted any tendency to return to its original flat configuration.

Although this invention has been described and illustrated in detail, it is to be understood that the same is by way of illustration and example only and is not to be taken by way of limitation, the spirit and scope of this invention being limited only by the terms of the appended claims.

I claim:

1. A method for forming solid polymeric seals comprising the steps of placing a ring shaped plastic blank on a first die member, placing a second die member over said first die member, holding said blank between said die members with a predetermined holding force which exerts a first pressure on said blank, discharging an explosive force of predetermined magnitude against a surface of said die member to create a second pressure which is translated through said first die member to a surface of said blank, said surface of said blank being of smaller area than said surface of said first die member, whereby said translated second pressure is multiplied and added to said first pressure to form a third pressure sufficient in magnitude to destroy the elastic memory of said blank, and thereby explosively setting said blank in conformance with said die members to form a plastic seal.

2. The process of claim 1 wherein said second pressure is selected from a range of 4,000 p.s.i. to 50,000 p.s.i.

3. The process of claim 2 wherein said third pressure is selected from a range of 40,000 p.s.i. to 25,000,000 p.s.i.

References Cited by the Examiner

UNITED STATES PATENTS

| | | | |
|---|---|---|---|
| 1,371,671 | 3/1921 | Duryea et al. | 264—84 |
| 2,646,595 | 7/1953 | Leistensnider. | |
| 2,948,923 | 8/1960 | Rocca et al. | |
| 3,032,824 | 5/1962 | Proud. | |
| 3,032,825 | 5/1962 | Proud | 18—55 |
| 3,045,287 | 7/1962 | Yost et al. | |
| 3,081,498 | 3/1963 | Davis et al. | 264—84 |
| 3,112,166 | 11/1963 | Montgomery et al. | 264—84 |
| 3,136,001 | 6/1964 | Gelbard | 18—42 |
| 3,138,827 | 6/1964 | Hamilton | 18—42 |

ROBERT F. WHITE, *Primary Examiner.*

WILLIAM STEPHENSON, ALEXANDER H. BRODMERKEL, *Examiners.*